US012634335B2

(12) United States Patent
Watanabe et al.

(10) Patent No.: US 12,634,335 B2
(45) Date of Patent: May 19, 2026

(54) ATTACK SCENARIO GENERATING APPARATUS, ATTACK SCENARIO GENERATING METHOD, AND COMPUTER READABLE RECORDING MEDIUM

(71) Applicant: NEC Corporation, Tokyo (JP)

(72) Inventors: Masafumi Watanabe, Tokyo (JP); Hirofumi Ueda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 138 days.

(21) Appl. No.: 18/571,986

(22) PCT Filed: Jun. 24, 2021

(86) PCT No.: PCT/JP2021/024027
§ 371 (c)(1),
(2) Date: Dec. 19, 2023

(87) PCT Pub. No.: WO2022/269881
PCT Pub. Date: Dec. 29, 2022

(65) Prior Publication Data
US 2024/0297896 A1        Sep. 5, 2024

(51) Int. Cl.
*H04L 9/40*          (2022.01)

(52) U.S. Cl.
CPC .................................. *H04L 63/1441* (2013.01)

(58) Field of Classification Search
CPC .................................................... H04L 63/1441
USPC ......................................... 726/22, 23, 24, 25
See application file for complete search history.

(56) References Cited

U.S. PATENT DOCUMENTS

| | | | |
|---|---|---|---|
| 8,122,504 B1 * | 2/2012 | Bush | H04L 63/1433 726/22 |
| 11,429,713 B1 * | 8/2022 | Donovan | H04L 63/1458 |
| 11,729,189 B1 * | 8/2023 | Deardorff | H04L 63/1433 726/23 |

(Continued)

FOREIGN PATENT DOCUMENTS

| | | |
|---|---|---|
| JP | 2019-185223 A | 10/2019 |
| WO | 2021/095223 A1 | 5/2021 |

OTHER PUBLICATIONS

English translation of Written opinion for PCT Application No. PCT/JP2021/024027, mailed on Aug. 17, 2021.

(Continued)

*Primary Examiner* — Teshome Hailu
(74) *Attorney, Agent, or Firm* — Sughrue Mion, PLLC

(57)        ABSTRACT

An attack scenario generating apparatus including: first attack step detection unit executes an attack simulation on a first virtual model obtained from a storage device in which a plurality of virtual models used to represent a target system are stored, and detects a first attack step that satisfies a damage condition with which damage occurs in the first virtual model; an input/output condition extraction unit extracts an input condition or an output condition of the first virtual model from the detected first attack step, or both the input condition and the output condition; a second attack step detection unit executes an attack simulation on a second virtual model obtained from the storage device, and detects a second attack step in which output of the second virtual model satisfies the input condition; and a combination unit combines the first attack step and the second attack step to generate an attack scenario.

9 Claims, 16 Drawing Sheets

(56)     References Cited

U.S. PATENT DOCUMENTS

| | | | |
|---|---|---|---|
| 2017/0032695 A1* | 2/2017 | Brueckner ............... | G09B 5/00 |
| 2021/0117536 A1 | 4/2021 | Takeuchi | |
| 2022/0269796 A1* | 8/2022 | Chase ..................... | G06F 21/32 |
| 2022/0414229 A1 | 12/2022 | Ohta et al. | |

OTHER PUBLICATIONS

International Search Report for PCT Application No. PCT/JP2021/024027, mailed on Aug. 17, 2021.

* cited by examiner

Fig. 1

VIRTUAL MODELS IN TARGET SYSTEM

| Step | PS1 | T2 (actual) | LS2 (read) | PLC2.LS2 (send data) |
|---|---|---|---|---|
| 1 | On | Low-Low | Low-Low | Low-Low |
| 2 | On | Low | Low | Low |
| 3 | On | Middle | Middle | Middle |
| 4 | On | High | High | High |
| 5 | On | High-High | High-High | High-High |
| 6 | On | Overflow | Overflow | Overflow |

32

| Step | PS1 | T2 (actual) | LS2 (read) | PLC2.LS2 (send data) |
|---|---|---|---|---|
| 1 | On | Low-Low | Low | Low |
| 2 | On | Low | Low | Low |
| 3 | On | Middle | Low | Low |
| 4 | On | High | Low | Low |
| 5 | On | High-High | Low | Low |
| 6 | On | Overflow | Low | Low |

| Step | PLC2.LS2 (received data) | V2 | PS1 |
|---|---|---|---|
| 1 | | | |
| 2 | | | |
| 3 | | | |
| 4 | | | |
| 5 | High-High | Closed | Off |
| 6 | | | |

42

| Step | PLC2.LS2 (received data) | V2 | PS1 |
|---|---|---|---|
| 1 | Low | Open | On |
| 2 | Low | Open | On |
| 3 | Low | Open | On |
| 4 | Low | Open | On |
| 5 | Low | Open | On |
| 6 | Low | Open | On |

Fig. 7

ATTACK SCENARIO

| Step | PS1 | T2 (actual) | LS2 (read) | PLC2.LS2 (send data) | PLC2.LS2 (received data) | V2 | PS1 |
|------|-----|-------------|------------|----------------------|--------------------------|------|-----|
| 1 | On | Low-Low | Low | Low | Low | Open | On |
| 2 | On | Low | Low | Low | Low | Open | On |
| 3 | On | Middle | Low | Low | Low | Open | On |
| 4 | On | High | Low | Low | Low | Open | On |
| 5 | On | High-High | Low | Low | Low | Open | On |
| 6 | On | Overflow | Low | Low | Low | Open | On |

DAMAGE CONDITION

ATTACK SCENARIO

| Step | PC | SV1 | EWS | PLC1 | PLC1 | V2 | PS1 | PS1 | T2 | LS2 |
|------|----|-----|-----|------|------|----|-----|-----|----|-----|
| 1 | → | Data inject | | | | | | | | |
| 2 | | Local exploit | | | | | | | | |
| 3 | | → | Remote exploit | | | | | | | |
| 4 | | | → | Remote exploit | PLC1.V2 = Compromised | | | | | |
| 5 | | | | | Open | Open | On | On | Low–Low | Low–Low |
| 6 | | | | | Open | Open | On | On | Low | Low |
| 7 | | | | | Open | Open | On | On | Middle | Middle |
| 8 | | | | | Open | Open | On | On | High | High |
| 9 | | | | | Open | Open | On | On | High–High | High–High |
| 10 | | | | | Open | Open | On | On | Overflow | Overflow |

ATTACK STEP S3 | ATTACK STEP S2 | ATTACK STEP S1

INPUT CONDITION OF MODEL M1 | INPUT CONDITION OF MODEL M2 | DAMAGE CONDITION

| CONVERSION RULE NUMBER | PRE-CONVERSION TYPE | PRE-CONVERSION CONDITION | POST-CONVERSION TYPE | POST-CONVERSION CONDITION |
|---|---|---|---|---|
| 1 | B | Data-inject | A | Compromised |
| 2 | B | Remote exploit | A | Compromised |
| 3 | B | Local exploit | A | Compromised |
| 4 | A | State-is-not-reliable | B | Data-inject |
| ... | ... | ... | ... | ... |

132

| CONVERSION RULE NUMBER | PRE-CONVERSION TYPE | DEVICE ID | PRE-CONVERSION CONDITION | POST-CONVERSION TYPE | DEVICE ID | POST-CONVERSION CONDITION |
|---|---|---|---|---|---|---|
| 1 | B | HMI | Logon | A | V1 | Compromised |
| 2 | B | HMI | Logon | A | V2 | Compromised |
| 3 | B | HMI | Logon | A | LS | Compromised |
| 4 | B | EWS | Remote exploit | A | PLC | Data-inject |
| ... | ... | ... | ... | ... | ... | ... |

VIRTUAL MODELS IN TARGET SYSTEM

M4

MODEL

Attacker

GW1 ~ GATEWAYS

GW2 ~ GATEWAYS

SV1

SERVER COMPUTER

M5

MODEL

COMPUTER

PC1

SERVER COMPUTER

SV4

SERVER COMPUTER

SV5

SERVER COMPUTER

SV6

SV6 = Data inject

DAMAGE CONDITION

PC1 = Local exploit

INPUT CONDITION OF MODEL M5

Fig. 15

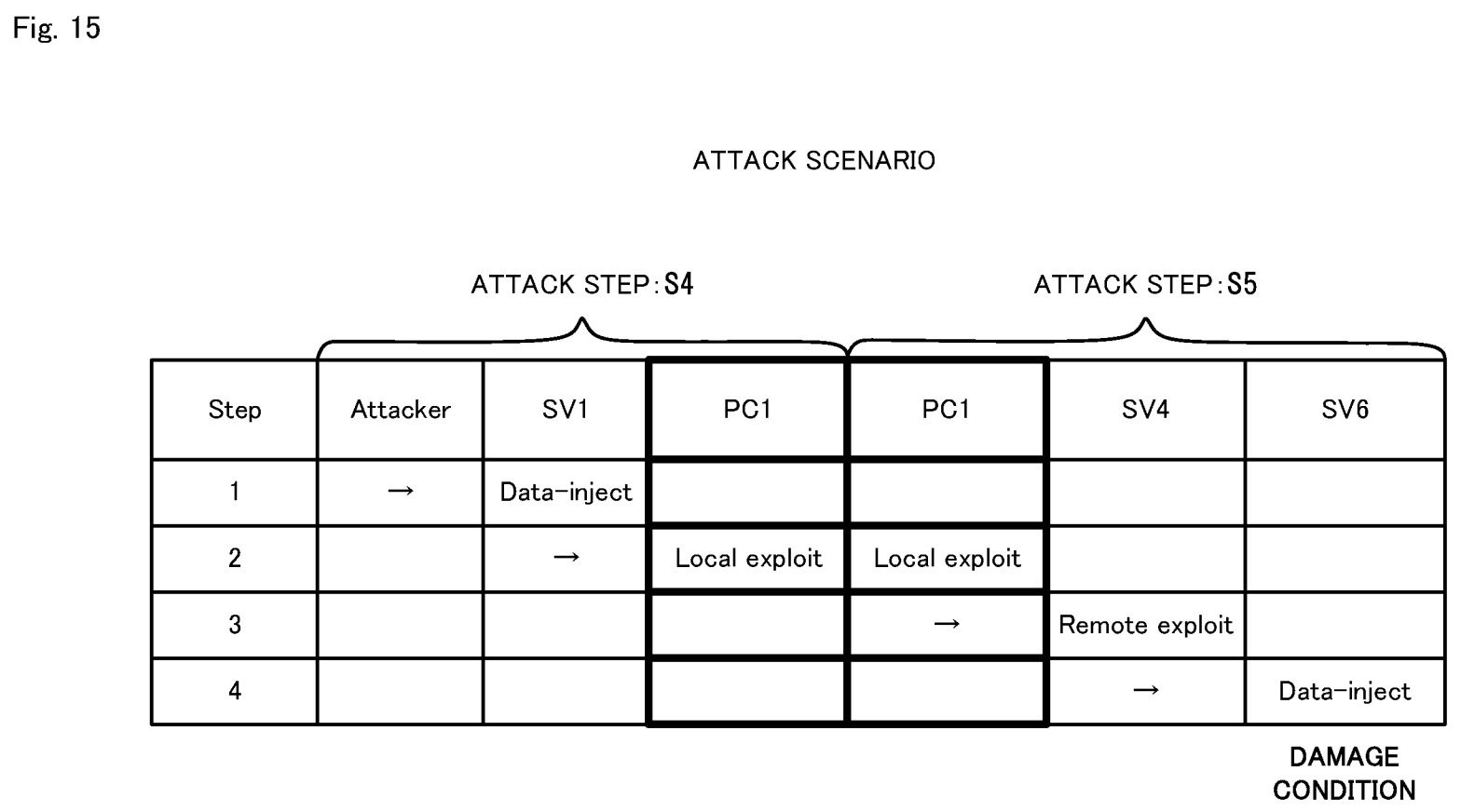

ATTACK SCENARIO

| Step | Attacker | SV1 | PC1 | PC1 | SV4 | SV6 |
|---|---|---|---|---|---|---|
| 1 | ↑ | Data-inject | | | | SV6 |
| 2 | | ↑ | Local exploit | Local exploit | | |
| 3 | | | ↑ | ↑ | Remote exploit | |
| 4 | | | | | ↑ | Data-inject |

ATTACK STEP:S4 — ATTACK STEP:S5

DAMAGE CONDITION

ATTACK SCENARIO GENERATING APPARATUS, ATTACK SCENARIO GENERATING METHOD, AND COMPUTER READABLE RECORDING MEDIUM

This application is a National Stage Entry of PCT/JP2021/024027 filed on Jun. 24, 2021, the contents of all of which are incorporated herein by reference, in their entirety.

TECHNICAL FIELD

The present invention relates to an attack scenario generating apparatus and an attack scenario generating method that generate an attack scenario, and further relates to a computer readable recording medium on which a program for realizing the same is recorded.

BACKGROUND ART

Technology for analyzing latent cyber-attack risks in a system is known. For example, there is a known technology for executing an attack simulation on a virtually constructed model of an OT (Operational Technology) system, an IoT (Internet of Things) system, or the like.

Patent document 1 discloses technology for comprehensively extracting attack paths envisioned for when a target system undergoes a cyber-attack, and deriving attack instances (including attack content and counter-measures, for example) for apparatuses that enable the attack paths.

With the information processing apparatus disclosed in Patent document 1, first, attack paths are extracted based on a list of apparatus groups included in a system and a list of connection relations between the apparatuses. Next, the information processing apparatus in Patent document 1 uses the attack application of each apparatus forming an extracted attack path and node (apparatus) conditions to search an attack instance database in which past attack applications and node conditions are stored in association with each other to obtain attack instances that correspond to the apparatuses.

LIST OF RELATED ART DOCUMENTS

Patent Document

Patent document 1: Japanese Patent Laid-Open Publication No. 2019-185223A

SUMMARY

Technical Problems

However, in the technology in Patent document 1, although attack instances are derived, no apparatus that executes attack simulations on a virtual model replicating a target system and generates attack scenarios is disclosed.

Also, when a large-scale plant is a target system, if the large-scale plant includes many devices, a large-capacity memory is required in order to execute an attack simulation on the aforementioned virtual model, and the processing time of the attack simulation increases. Thus, the processing time required to generate an attack scenario also increases.

As one aspect, an example object is to provide an attack scenario generating apparatus, an attack scenario generating method, and a computer readable recording medium that reduce the processing time required to generate an attack scenario.

Solution to the Problems

In order to achieve the example object described above, an attack scenario generating apparatus according to an example aspect includes:

first attack step detection unit executes an attack simulation on a first virtual model obtained from a storage device in which a plurality of virtual models used to represent a target system are stored, and detects a first attack step that satisfies a damage condition with which damage occurs in the first virtual model;

an input/output condition extraction unit extracts an input condition or an output condition of the first virtual model from the detected first attack step, or both the input condition and the output condition;

a second attack step detection unit executes an attack simulation on a second virtual model obtained from the storage device, and detects a second attack step in which output of the second virtual model satisfies the input condition; and a combination unit combining the first attack step and the second attack step to generate an attack scenario.

Also, in order to achieve the example object described above, an attack scenario generating method according to an example aspect in which a computer is caused to carry out:

executing an attack simulation on a first virtual model obtained from a storage device in which a plurality of virtual models used to represent a target system are stored, and detecting a first attack step that satisfies a damage condition with which damage occurs in the first virtual model;

extracting an input condition or an output condition of the first virtual model from the detected first attack step, or both the input condition and the output condition;

executing an attack simulation on a second virtual model obtained from the storage device, and detecting a second attack step in which output of the second virtual model satisfies the input condition; and combining the first attack step and the second attack step to generate an attack scenario.

Furthermore, in order to achieve the example object described above, a computer-readable recording medium according to an example aspect includes a program recorded on the computer-readable recording medium, the program including instructions that cause the computer to carry out:

executing an attack simulation on a first virtual model obtained from a storage device in which a plurality of virtual models used to represent a target system are stored, and detecting a first attack step that satisfies a damage condition with which damage occurs in the first model;

extracting an input condition or an output condition of the first virtual model from the detected first attack step, or both the input condition and the output condition;

executing an attack simulation on a second model obtained from the storage device, and detecting a second attack step in which output of the second virtual model satisfies the input condition; and combining the first attack step and the second attack step to generate an attack scenario.

Advantageous Effects of the Invention

As one aspect, it is possible to reduce the processing time required to generate an attack scenario.

BRIEF DESCRIPTION OF THE DRAWINGS

FIG. 1 is a diagram for describing an example of divided virtual models.

FIG. 3 is a diagram for describing an example of first attack steps.

FIG. 4 is a diagram for describing an example of second attack steps.

FIG. 7 is a diagram for describing an attack scenario.

FIG. 11 is a diagram for describing combination of attack steps in the second example embodiment.

FIG. 12 is a diagram for describing an example of a conversion table.

FIG. 15 is a diagram for describing an attack scenario of the third example embodiment.

EXAMPLE EMBODIMENT

Figure 2:
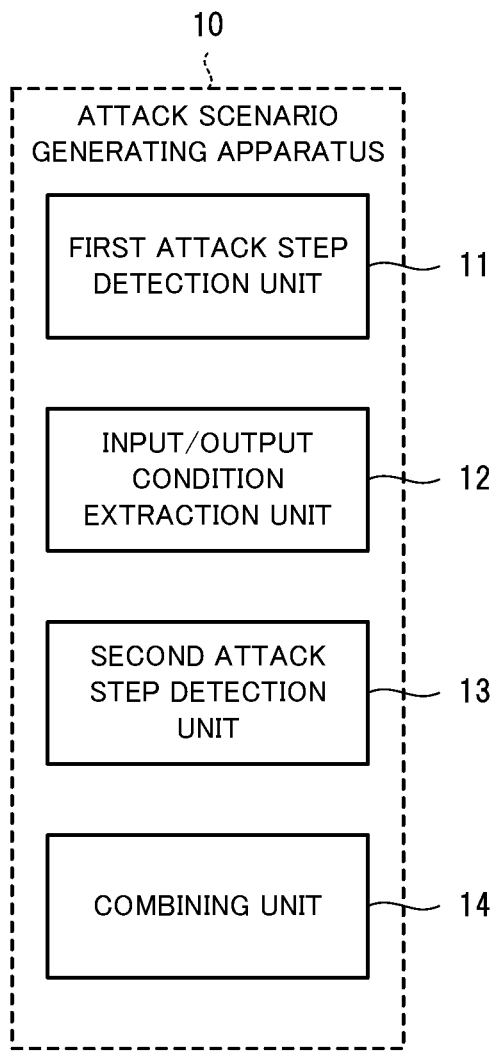
FIG. 2 is a diagram for describing an example of an attack scenario generating apparatus.

First, an overview for facilitating comprehension of the embodiments described below will be described.

In a large-scale plant, the plant includes many devices, and thus when an attack simulation is executed on a virtual model that is a virtualization of the large-scale plant (target system), the size of the search space increases exponentially according to the number of devices. Also, the amount of memory required for an attack simulation increases. Furthermore, the processing time of the attack simulation increases, that is, the processing time required to search for (generate) attack scenarios increases.

Thus, the virtual model is divided, and attack simulations are executed on the divided virtual models.

Figure 1:
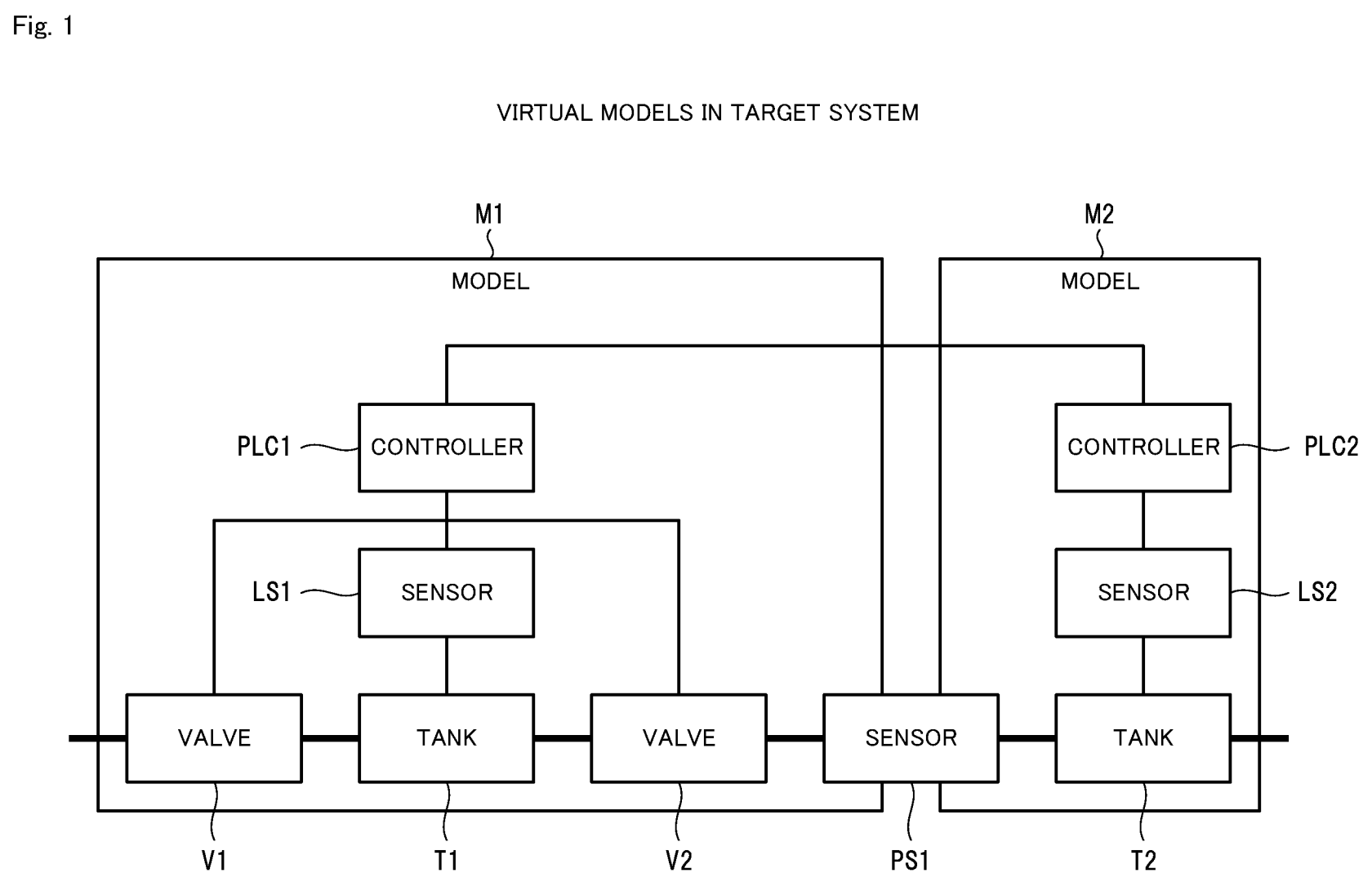

FIG. 1 is a diagram for describing an example of divided virtual models. In the example shown in FIG. 1, a virtual model corresponding to a water storage system is divided into virtual models that are indicated using models M1 and M2.

The model M1 is a model for controlling the water level of a tank T1. The model M1 includes a controller PLC1, a sensor LS1, a valve V1, a valve V2, a tank T1, and a sensor PS1, which represent functions of various devices.

The model M2 is a model for controlling the water level of a tank T2. The model M2 includes a controller PLC2, a sensor LS2, a tank T2, and the sensor PS1, which represent functions of various devices.

Here, the sensor PS1 is a sensor that measures the flow rate (flowing/not flowing: On/Off) of water flowing through a pipe connecting the tank T1 and the tank T2. Also, the sensor PS1 is related to both the model M1 and model M2.

The controller PLC1 controls the opening/closing (Open/Closed state) of the valves V1 and V2 based on the water level of the tank T1 measured by the sensor LS1 that measures the water level of the tank T1. Note that, in the example shown in FIG. 1, the sensor LS1 measures the water level in six levels, namely Low-Low, Low, Middle, High, High-High, and Overflow.

The controller PLC2 transmits the water level of the tank T2 measured by the sensor LS2 that measures the water level of the tank T2 to the controller PLC1.

Then, the controller PLC1 receives the water level of the tank T2 from the controller PLC2, and controls opening/closing of the valve V2 based on the water level of the tank T2 thus received.

As with the example shown in FIG. 1, by dividing a virtual model into the models M1 and M2, the number of devices included in each of the models M1 and M2 can be reduced. Thus, the total of the processing times of the attack simulations executed on the models M1 and M2 can be made shorter than the processing time in a case where an attack simulation is executed on an undivided virtual model.

However, the control loop of the divided virtual models is not necessarily closed, and thus the virtual models affect or are affected by another virtual model. Even in the example shown in FIG. 1, the divided models M1 and M2 affect each other.

Thus, (1) simply executing attack simulations on the divided virtual models cannot account for this impact, and thus it is difficult to search for attack scenarios such as those obtained by executing an attack simulation on an undivided virtual model.

Furthermore, (2) if each divided virtual model has a different description format for describing the states of the devices, it is difficult to search for attack scenarios such as those obtained by executing an attacking simulation on an undivided virtual model.

The inventor of the present invention found, through such a process, the aforementioned issues (1) and (2) that occur when searching for attack scenarios using divided virtual models, and the inventor derived a means for solving these issues.

In other words, the inventor derived a means with which it is possible to search for attack scenarios using divided virtual models. Consequently, the processing time required to search for attack scenarios can be reduced, and an increase in the amount of memory used in attack simulations can also be suppressed.

Embodiments are described below with reference to the drawings. Note that, in the drawings described in the following, the same reference symbols are given to elements having the same function or corresponding functions, and repetitive description thereof may be omitted.

First Example Embodiment

A configuration of an attack scenario generating apparatus in a first example embodiment will be described using FIG. 2. FIG. 2 is a diagram for describing an example of an attack scenario generating apparatus.

[Apparatus Configuration]

An attack scenario generating apparatus 10 executes attack simulations on each of a plurality of divided virtual models, and generates attack scenarios by combining attack steps of the divided virtual models in order to reduce the processing time required to generate an attack scenario. An increase in the amount of memory used in the attack simulations can also be suppressed.

It is conceivable to use an ordinary attack simulation for the attack simulations. Also, a different attack simulation may be used for each divided virtual model.

As shown in FIG. 2, the attack scenario generating apparatus 10 includes a first attack step detection unit 11, an input/output condition extraction unit 12, a second attack step detection unit 13, and a combining unit 14.

The attack scenario generating apparatus 10 is, for example, a central processing unit (CPU), a programmable device such as a field-programmable gate array (FPGA), a graphics processing unit (GPU), a circuit including at least one of the foregoing, or an information processing apparatus such as a server computer, a computer, or a mobile terminal.

The first attack step detection unit 11 executes an attack simulation on a first virtual model obtained from a storage device (not shown) in which a plurality of divided virtual models used to represent a target system are stored, and detects a first attack step that satisfies a damage condition with which damage occurs in the first virtual model.

Specifically, first, the first attack step detection unit 11 obtains the first virtual model from the storage device. Next, the first attack step detection unit 11 executes, on the first virtual model, an attack simulation that searches for a first attack step satisfying a damage condition. Next, the first attack step detection unit 11 obtains, as a result of the attack simulation, the first attack step satisfying the damage condition, and stores the first attack step in the storage device.

The storage device stores the virtual models obtained by dividing the target system. In the case of the example shown in FIG. 1, the models M1 and M2 are stored in the storage device. Note that the storage device may be provided inside or outside the attack scenario generating apparatus 10.

The virtual models are pieces of information that indicate the device states in a predetermined description format such as a text format.

The damage condition is information indicating damage that occurs in a target system when subjected to a cyber-attack. The damage condition of the target system in FIG. 1 is water overflowing from the tank T2 in the model M2, for example.

The first attack step is information indicating changes that occur in the states of the devices included in the first virtual model from when an attack simulation is executed on the first virtual model to when the first virtual model enters a state where the damage condition is satisfied.

FIG. 3 is a diagram for describing an example of first attack steps. First attack steps 31 and 32 shown in FIG. 3 are results obtained by executing, on the model M2, an attack simulation that searches for a first attack step satisfying the damage condition.

Specifically, the first attack step 31 is a result obtained by executing an attack simulation on the model M2 in a normal state under the damage condition (T2=overflow) that water overflows from the tank T2. Also, the first attack step 32 is a result obtained by executing an attack simulation while envisioning that the sensor LS2 (device) in the model M2 is in an abnormal state, under the damage condition (T2=overflow) that water overflows from the tank T2.

The input/output condition extraction unit 12 extracts an input condition or an output condition of the first virtual model, or both, from the detected first attack steps. Specifically, first, the input/output condition extraction unit 12 obtains the first attack steps from the storage device. Next, the input/output condition extraction unit 12 uses the first attack steps to extract an input condition or an output condition of the first virtual model, or both.

The input condition is information indicating the state of a device set in advance as an input device in the first attack step among the devices included in a target virtual model.

The output condition is information indicating the state of a device set in advance as an output device in the first attack step among the devices included in a target virtual model.

The input conditions of the first attack steps 31 and 32 will be described. Water from the tank T1 in the model M1 is supplied to the tank T2 in the model M2, and thus the state of the sensor PS1 upstream of the tank T2, that is whether or not the flow of water has been measured, is the input condition of the model M2. Thus, in the case of the first attack steps 31 and 32, the state where the sensor PS1 has measured the flow of water (PS1=On) is the input condition of the model M2.

The output conditions of the first attack steps 31 and 32 will be described. The controller PLC2 in the model M2 transmits the water level of the tank T2 measured by the sensor LS2 to the controller PLC1 in the model M1, and thus the state of the sensor LS2 transmitted by the controller PLC2 is the output condition of the model M2.

Thus, in the first attack step 31, the state of the sensor LS2 (PLC2.LS2=High-High) transmitted by the controller PLC2 is the output condition of the model M2. In the first attack step 32, the state of the sensor LS2 (PLC2.LS2=Low) transmitted by the controller PLC2 to the controller PLC1 is the output condition of the model M2.

The second attack step detection unit 13 executes an attack simulation on a second virtual model related to the first virtual model, and detects, as output of the second virtual model, a second attack step that satisfies an input condition extracted from a first attack step.

Specifically, first, the second attack step detection unit 13 obtains the second virtual model from the storage device. Next, the second attack step detection unit 13 sets the input of the second virtual model. Then, the second attack step detection unit 13 executes, on the second virtual model, an attack simulation that satisfies the input condition extracted from the first attack step. Next, the second attack step detection unit 13 obtains, as a result of the attack simulation, the second attack step that satisfies the input condition, and stores the second attack step in the storage device (not shown).

The second attack step is information indicating changes that occur in the states of the devices included in the second virtual model from when the attack simulation satisfying the input condition is executed on the second virtual model to when the second virtual model enters a state where the input condition is satisfied.

FIG. 4 is a diagram for describing an example of second attack steps. Second attack steps 41 and 42 shown in FIG. 4 are results obtained by setting the output condition of the model M2 as the input of the model M1 and executing an attack simulation that searches for the second attack step satisfying the input condition of the model M2 serving as the output of the model M1. Note that, in the second attack step 41, some of the device states of the attack step are omitted.

Figure 5:
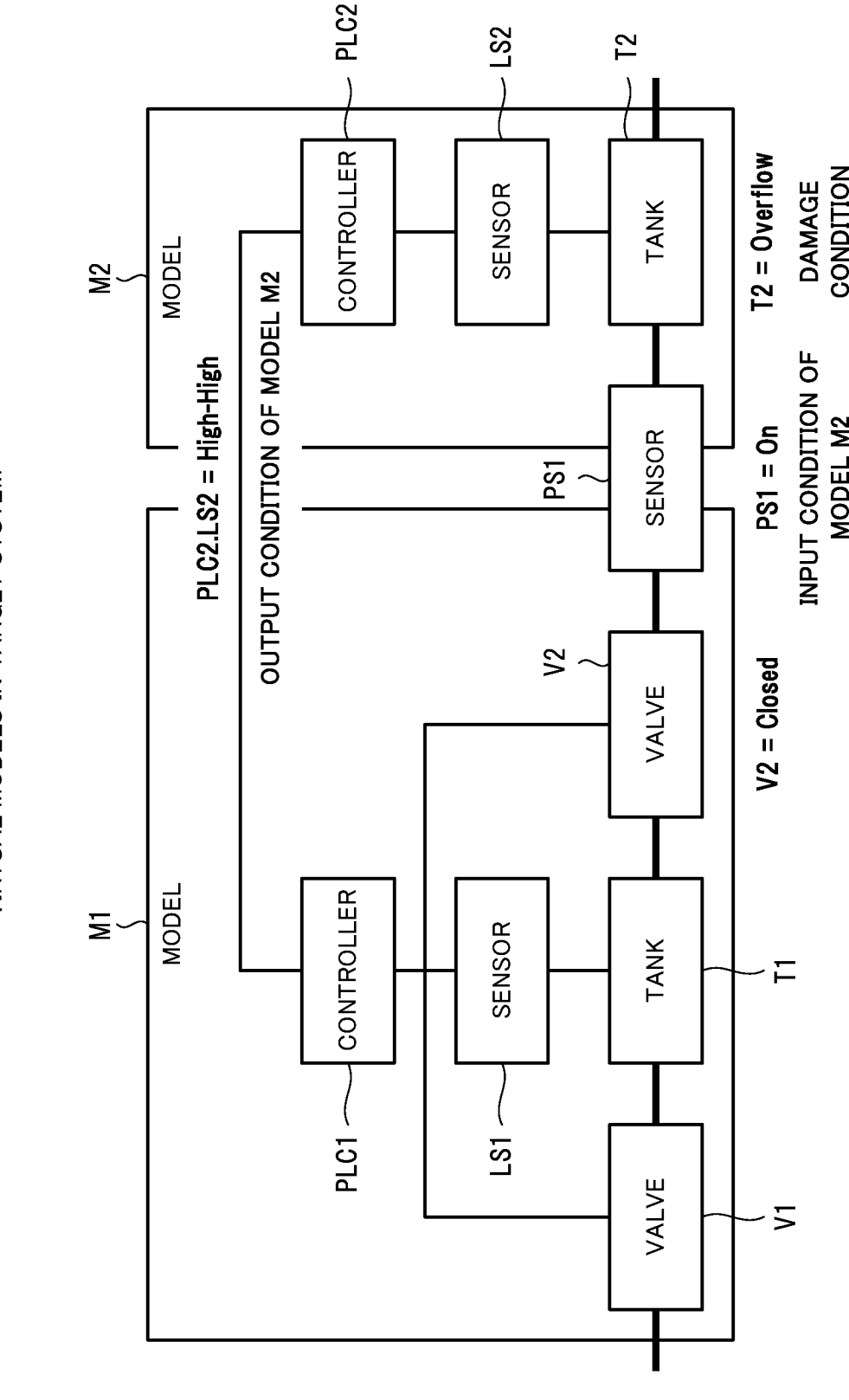
FIG. 5 is a diagram for describing the relation between the virtual models and the first and second attack steps.
Figure 6:
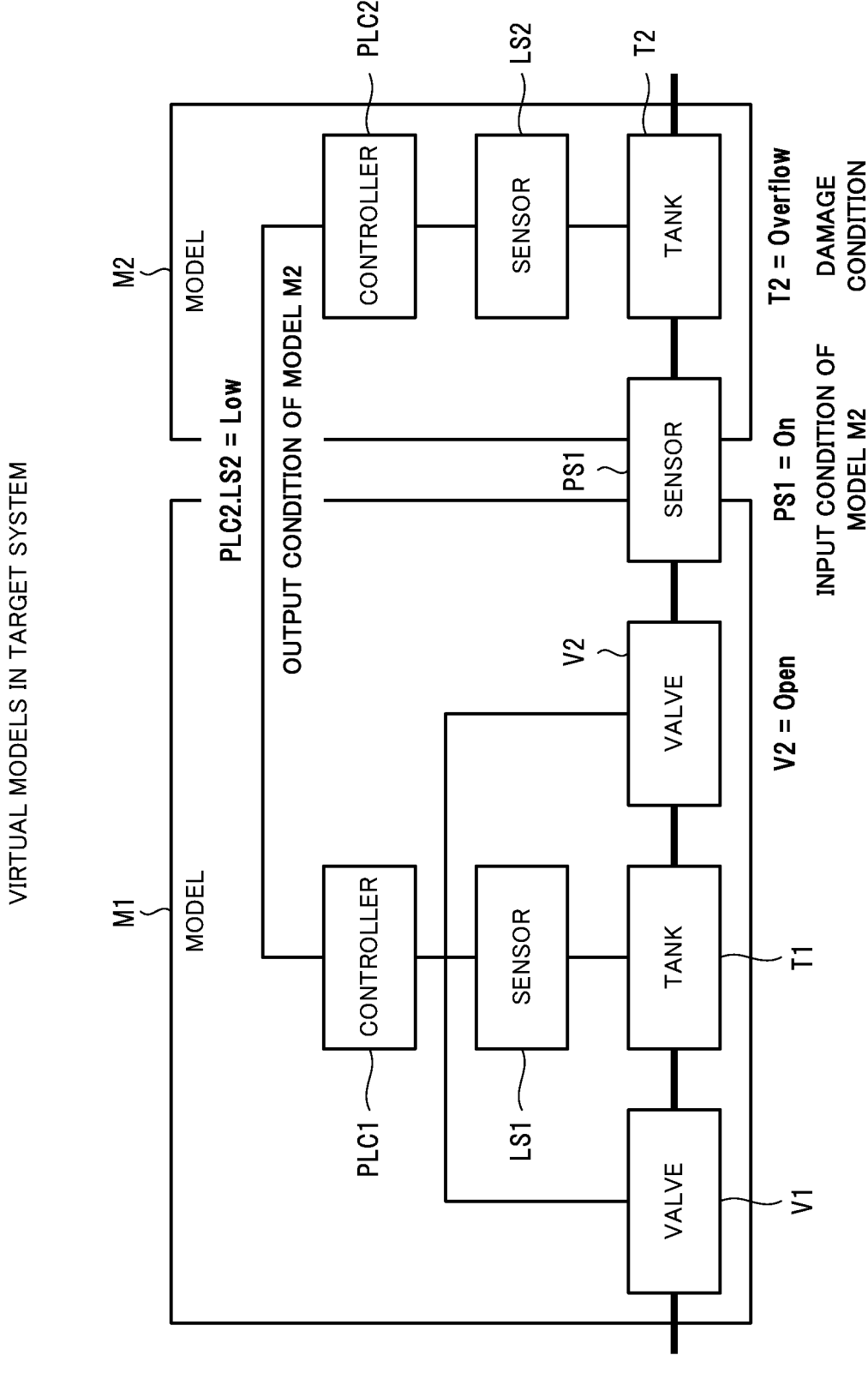
FIG. 6 is a diagram for describing the relation between the virtual models and the first and second attack steps.

FIGS. 5 and 6 are diagrams for describing the relation between the virtual models and the first and second attack steps. To detect the second attack step 41 in FIG. 4, first, the state of the sensor LS2 (PLC2.LS2=High-High) transmitted from the controller PLC2 to the controller PLC1, which is the output condition extracted from the first attack step 31, is set as the input of the model M1.

Next, an attack simulation satisfying the state where the sensor PS1 has measured the flow of water (PS1=On) is executed on the model M1 in a normal state, with the input condition extracted from the first attack step 31 being set as the output. Consequently, the second attack step 41 is obtained.

However, in the case of the second attack step 41, the sensor PS1 in the model M2 does not enter the open state (PS1=On), and thus the second attack step 41 is not selected.

Next, to detect the second attack step 42 in FIG. 4, first, the state of the sensor LS2 (PLC2.LS2=Low) transmitted from the controller PLC2 to the controller PLC1, which is the output condition extracted from the first attack step 32, is set as the input of the model M1.

Next, an attack simulation satisfying the state where the sensor PS1 has measured the flow of water (PS1=On) is executed on the model M1 in a normal state, with the input condition extracted from the first attack step 32 set as the output. Consequently, the second attack step 42 is obtained.

In the case of the second attack step 42, the sensor PS1 of the model M2 is in the open state (PS1=On), that is, the input condition and the output condition with which the model M2 is damaged are satisfied, and thus the second attack step 42 is selected. That is, by falsifying the state of the sensor LS2 to PLC2.LS2=Low, the sensor PS1 enters the open state (PS1=On), and thus damage occurs in the model M2.

The combining unit 14 combines a first attack step and a second attack step to generate attack scenarios. Specifically, first, the combining unit 14 obtains a first attack step and a second attack step that satisfies the input condition and the output condition extracted in the first attack step from the storage device. For example, the combining unit 14 obtains the first attack step 32 and the second attack step 42.

Next, the combining unit 14 combines the first attack step and the second attack step to generate an attack scenario. FIG. 7 is a diagram for describing an attack scenario. The attack scenario shown in FIG. 7 is one where the first attack step 32 and the second attack step 42 are combined. Specifically, the state of the sensor LS2 (PLC2.LS2=Low) is the same in the first attack step 32 and the second attack step 42, and thus the steps are combined based on the state of the sensor LS2.

[Apparatus Operations]

Figure 8:
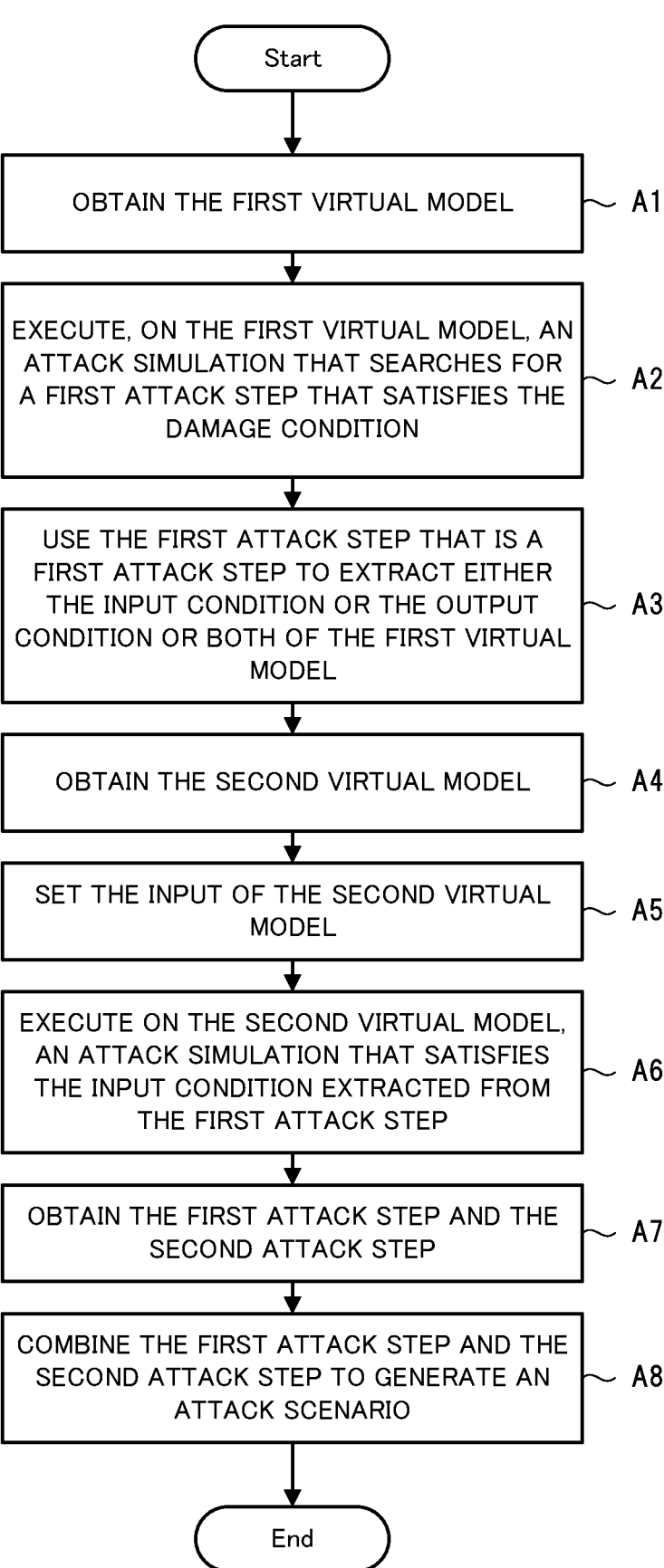
FIG. 8 is a diagram for describing an example of operation of the attack scenario generating apparatus.

Next, operation of the attack scenario generating apparatus in the first example embodiment will be described using FIG. 8. FIG. 8 is a diagram for describing an example of operation of the attack scenario generating apparatus. Drawings will be referred to as appropriate in the following description. Also, in the first example embodiment, an attack scenario generating method is implemented by causing the attack scenario generating apparatus to operate. Thus, a description of the operation of the attack scenario generating apparatus substitutes for a description of the attack scenario generating method in the first example embodiment below.

As shown in FIG. 8, first, the first attack step detecting unit 11 obtains the first virtual model from the storage device (step A1). Next, the first attack step detection unit 11 executes, on the first virtual model, an attack simulation that searches for a first attack step that satisfies the damage condition (step A2). Next, the first attack step detection unit 11 obtains, as the result of the attack simulation, the first attack step satisfying the damage condition, and stores the first attack step in the storage device.

Next, the input/output condition extraction unit 12 uses the first attack step obtained from the storage device to extract either the input condition or the output condition or both of the first virtual model (step A3).

Next, the second attack step detection unit 13 obtains the second virtual model from the storage device (step A4). Then, the second attack step detection unit 13 sets the input of the second virtual model (step A5). Next, the second attack step detection unit 13 executes, on the second virtual model, an attack simulation that satisfies the input condition extracted from the first attack step (step A6). Next, the second attack step detection unit 13 obtains, as the result of the attack simulation, the second attack step satisfying the input condition, and stores the second control step in the storage device (not shown).

Next, the combination unit 14 obtains the first attack step and the second attack step in which the input condition and the output condition extracted in the first attack step are satisfied from the storage device (step A7). Next, the combination unit 14 combines the first attack step and the second attack step to generate an attack scenario (step A8).

Note that, if there are other divided models as well, the processing in steps A1 to A8 described above is repeated to generate an attack scenario.

Effects of First Example Embodiment

In a large-scale plant, the plant includes many devices, and thus, when an attack simulation is executed on a virtual model that is a virtualization of the large-scale plant, a large-capacity memory is required and the processing time of the attack simulation increases, that is, the processing time required to generate the attack scenario also increases.

However, in the first example embodiment, a virtual model of a target system is divided, and attack simulations are executed using the divided virtual models, and thus the amount of memory used can be reduced compared to the case where an attack simulation is executed on the entire target system.

Also, in the first example embodiment, the virtual model is divided, attack simulations are executed on each divided virtual model, and attack scenarios are generated based on the execution results (first and second attack steps), and thus the processing time required to generate attack scenarios can be reduced.

Also, by repeating the aforementioned processing until the initial attack step of a cyber attack is found, it is possible to generate an attack scenario that spans from intrusion into a target system to when damage occurs in the target system.

Furthermore, attack steps may be generated in parallel. For example, attack simulations may be executed in parallel.

Second Example Embodiment

Figure 9:
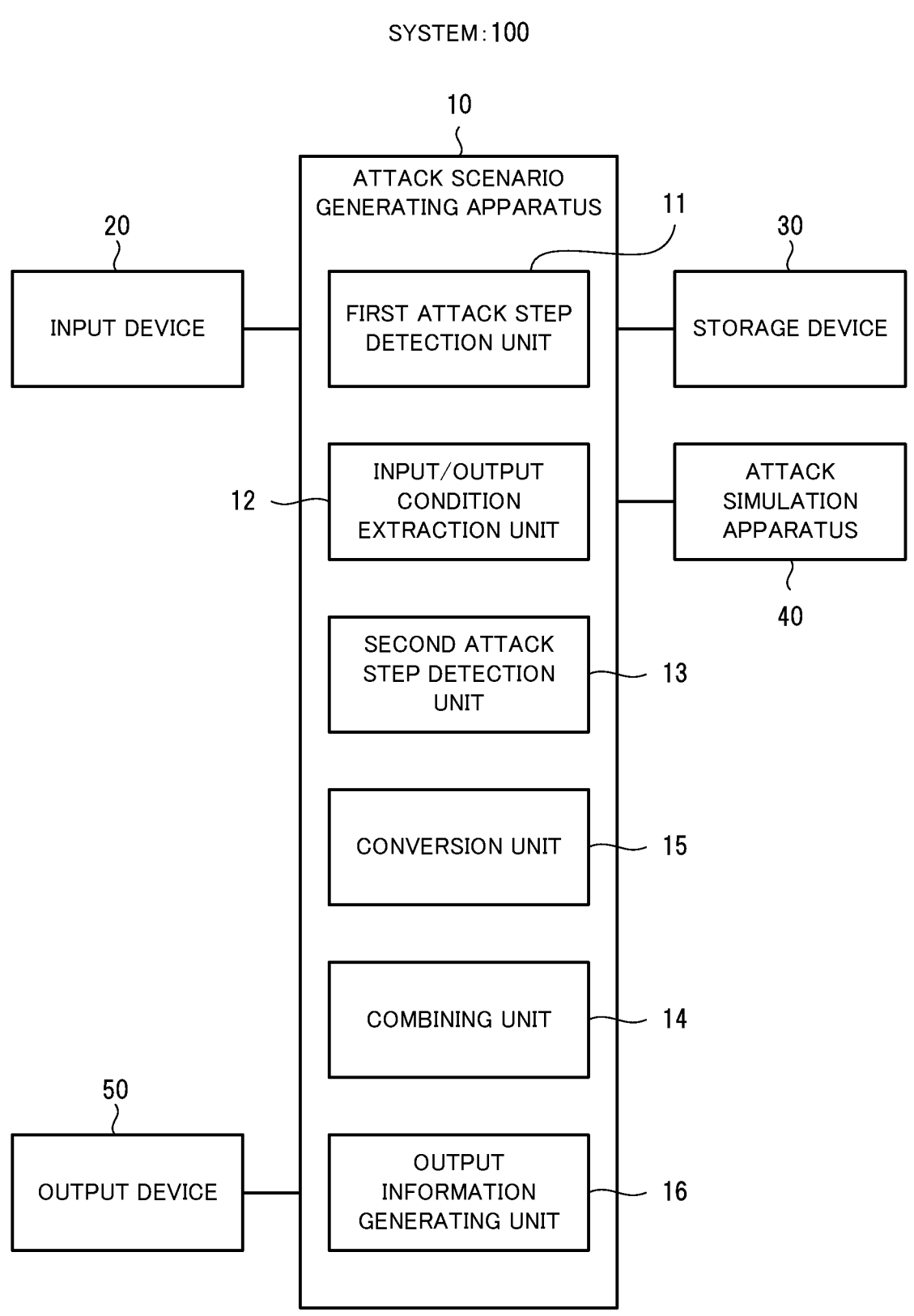
FIG. 9 is a diagram showing an example of a system including the attack scenario generating apparatus.

A configuration of a system including the attack scenario generating apparatus in a second example embodiment will be described using FIG. 9. FIG. 9 is a diagram showing an example of a system including the attack scenario generating apparatus.

[System Configuration]

As shown in FIG. 9, a system 100 in the second example embodiment includes an attack scenario generating apparatus 10, an input device 20, a storage device 30, an attack simulation apparatus 40, and an output device 50.

The attack scenario generating apparatus 10 includes a first attack step detecting unit 11, an input/output condition extraction unit 12, a second attack step detection unit 13, and a combination unit 14, and furthermore a conversion unit 15 and an output information generating unit 16.

The input device 20 is a device for inputting settings such as a damage condition. For example, the input device 20 is an input device such as a keyboard, a mouse, or a touch panel.

The storage device 30 stores virtual models obtained by dividing a target system (first and second virtual models), a first attack step, a second attack step, an input condition, an output condition, an attack scenario, various setting parameters, and the like. The storage device 30 is a database, a server computer, or the like. In the example in FIG. 9, the storage device 30 is provided outside the attack scenario generating apparatus 10, but may be provided in the attack scenario generating apparatus 10. Also, the storage device 30 may be divided into a plurality of storage devices.

The attack simulation apparatus 40 is an apparatus that executes attack simulations for finding the first and second attack steps. The attack simulation apparatus 40 is, for example, an apparatus such as a server computer in which an attack simulator is installed. Note that, in the case of FIG. 9, the attack simulation apparatus 40 is provided outside the attack scenario generating apparatus 10, but may be provided in the attack scenario generating apparatus 10.

The output device 50 obtains output information converted into an output-enabled format by the output information generating unit 16, and outputs generated images, audio, and the like based on the output information. The output device 50 is an image display device or the like using liquid crystal, organic EL (Electro Luminescence), a CRT (Cathode Ray Tube), or the like. Furthermore, the image display device may be provided with an audio output device such as a speaker, for example. Note that the output device 50 may be a printing device such as a printer.

The attack scenario generating apparatus will be described in detail.

The first attack step detecting unit 11, the input/output condition extracting unit 12, the second attack step detection unit 13, and the combining unit 14 have already been described, and thus description thereof is omitted.

If there are different types of attack simulations, the converting unit 15 converts the input conditions and the output conditions into descriptions that correspond to the type of attack simulation.

Conversion of description formats will be described.

Figure 10:
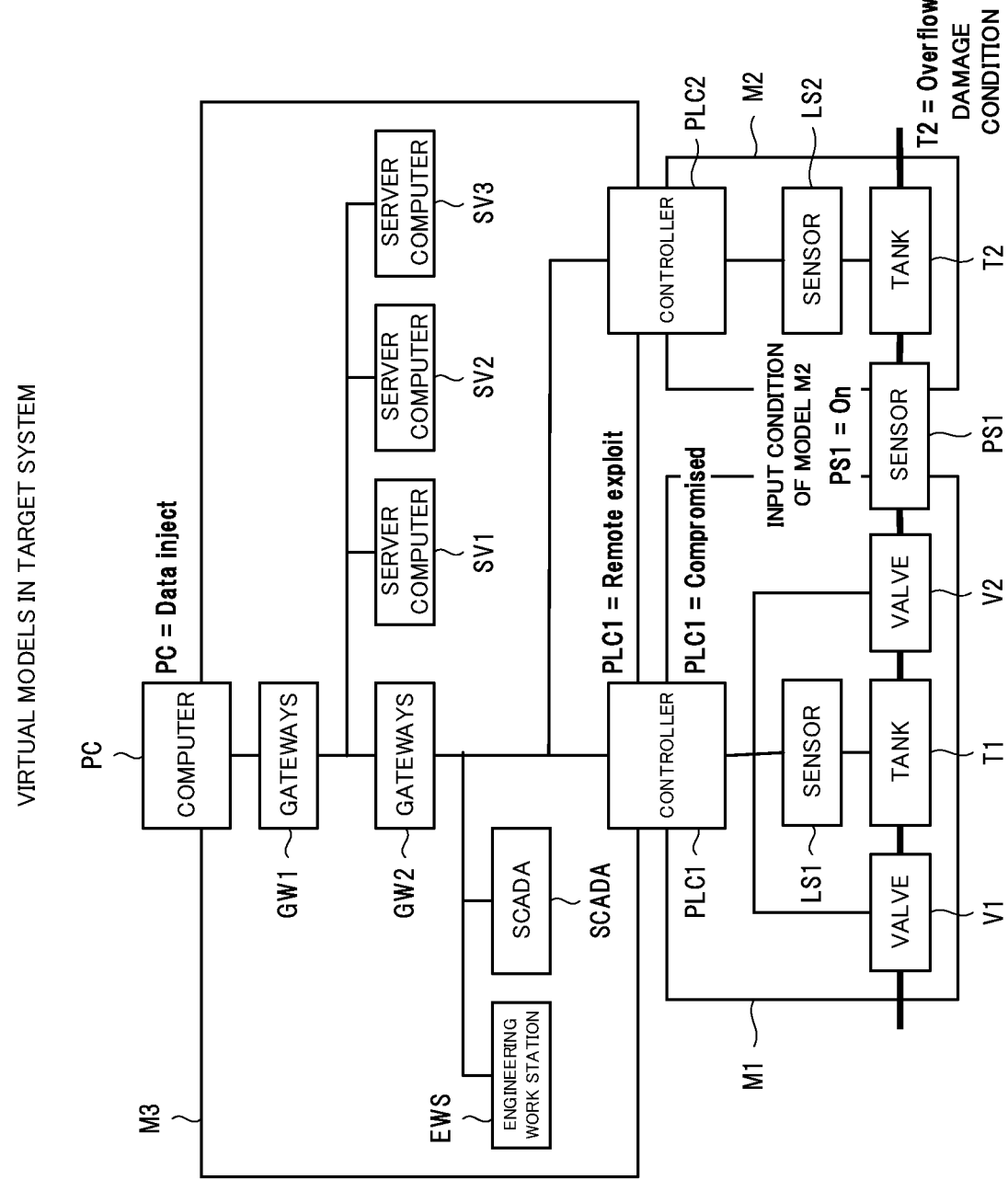
FIG. 10 is a diagram for describing virtual models of different attack simulations.

FIG. 10 is a diagram for describing virtual models of different attack simulations. The virtual models in FIG. 10 include the aforementioned models M1 and M2, as well as a model M3.

The model M3 includes a computer PC, server computers SV1, SV2, and SV3, gateways GW1 and GW2, an engineering work station EWS, and a SCADA (Supervisory Control And Data Acquisition: a system that performs system monitoring and process control using a computer) system, which represent functions of various devices. Also, the model M3 uses a different type of attack simulation from that of the models M1 and M2.

FIG. 11 is a diagram for describing combination of attack steps in the second example embodiment. The description format of an attack step S3 in model M3 differs from the description format of the attack step S2 in the model M1 and the attack step S1 in the model M2. Thus, the combining unit 14 cannot combine the attack step S3 with the attack step S2 and the attack step S1.

The attack step S1 shown in FIG. 11 is information indicating changes that occur in the states of the devices included in the model M2 from when the attack simulation is executed on the model M2 to when the model M2 enters a state where the damage condition is satisfied (T2=Overflow).

The attack step S2 shown in FIG. 11 is information indicating changes that occur in the states of the devices included in the model M1 from when the attack simulation is executed on the model M1 to when the model M1 enters a state where the input condition (PS=On) of the model M2 is satisfied.

The attack step S3 shown in FIG. 11 is information indicating changes that occur in the states of the devices included in the model M3 from when the attack simulation is executed on the model M3 to when the model M3 enters a state where the input condition of the model M1 (PLC1=Remote exploit/PLC1.V2=Compromised) is satisfied. Note that, in the attack step S3, some of the device states of the attack step are omitted.

The input condition of the attack step S2 in FIG. 11 "PLC1.V2=Compromised" in FIG. 11 indicates that an attacker can perform unauthorized operations using the controller PLC1 (sensor value falsification, operation falsification, and the like). Thus, in the attack step S3 in FIG. 11, the condition "Remote exploit", which is the condition that unauthorized operations can be performed using the controller, is set, and an attack simulation is performed.

The expression "unauthorized operations" differs depending on the attack simulation method, and it is sufficient to set a phrase that refers to the same state. In the second example embodiment, "Remote exploit" is set, but another phrase may be used provided that it indicates a state where unauthorized operations can be performed. For example, "Local exploit" (a state where unauthorized operations can be performed due to some sort of attack performed after logging into a target) may be designated.

Specifically, the conversion unit 15 determines whether or not the type of attack simulation is different in different attack steps. If the type of attack simulation is different in different attack steps, the conversion unit 15 uses conversion information to convert the descriptions of the input condition and the output condition included in the conversion-target attack steps into descriptions for converted attack simulation.

FIG. 12 is a diagram for describing an example of a conversion table. Conversion information 131 in FIG. 12 is a conversion table in which matching descriptions are associated with one another for two attack simulations. Also, conversion information 132 in FIG. 12 is a conversion table in which matching descriptions are associated with one another for each device, for two attack simulations.

The pieces of information 131 and 132 in FIG. 12 are pieces of information in which "conversion rule number", "pre-conversion type", "pre-conversion condition", "post-conversion type", and "post-conversion condition" are associated with each other. The conversion rule numbers "1" to "4" are pieces of information for identifying conversion rules. The pre-conversion type and post-conversion type "A" and "B" are pieces of information for identifying the type of attack simulation. Also, the device IDs "HMT", "EWS", "V1", "V2", "LS", and "PLC" in the conversion information 132 in FIG. 12 are pieces of information for identifying the devices.

The pre-conversion condition is information indicating the input condition and output condition before conversion. The post-conversion condition is information indicating the input condition and output condition after conversion. For example, when the pre-conversion condition "Remote exploit" of the conversion rule number "2" in the conversion information 131 is converted, the condition is converted to the post-conversion condition "Compromised".

The combining of the attack steps S1, S2, and S3 will be described.

First, the attack step S2 and the attack step S1 are combined using the combining unit 14, as described in the first example embodiment. Specifically, the state of the sensor PS1 (PS1=On) is the same for the attack step S2 and the attack step S1, and thus combining is performed based on the state of the sensor PS1.

Next, the combining unit 14 performs combining based on the output of the controller PLC1 in the attack step S3 (PLC1=Remote exploit) and the input of the controller PLC1 in the attack step S2 (PLC1=Compromised). When the output of the controller PLC1 in the attack step S3 (PLC1=Remote exploit) is converted, the description is the same as that of "PLC1=Compromised", which is the input condition of the model M1, and thus combining is performed based on "PLC1=Compromised".

In doing so, the combining unit 14 combines the attack steps S1, S2, and S3 to generate an attack scenario.

The output information generating unit 16 generates output information for displaying, on the output device 50, at least one or more of the entire virtual model of the target system, divided virtual models, attack steps, attack scenarios, damage conditions, input conditions, and output conditions.

[Apparatus Operation]

Figure 13:
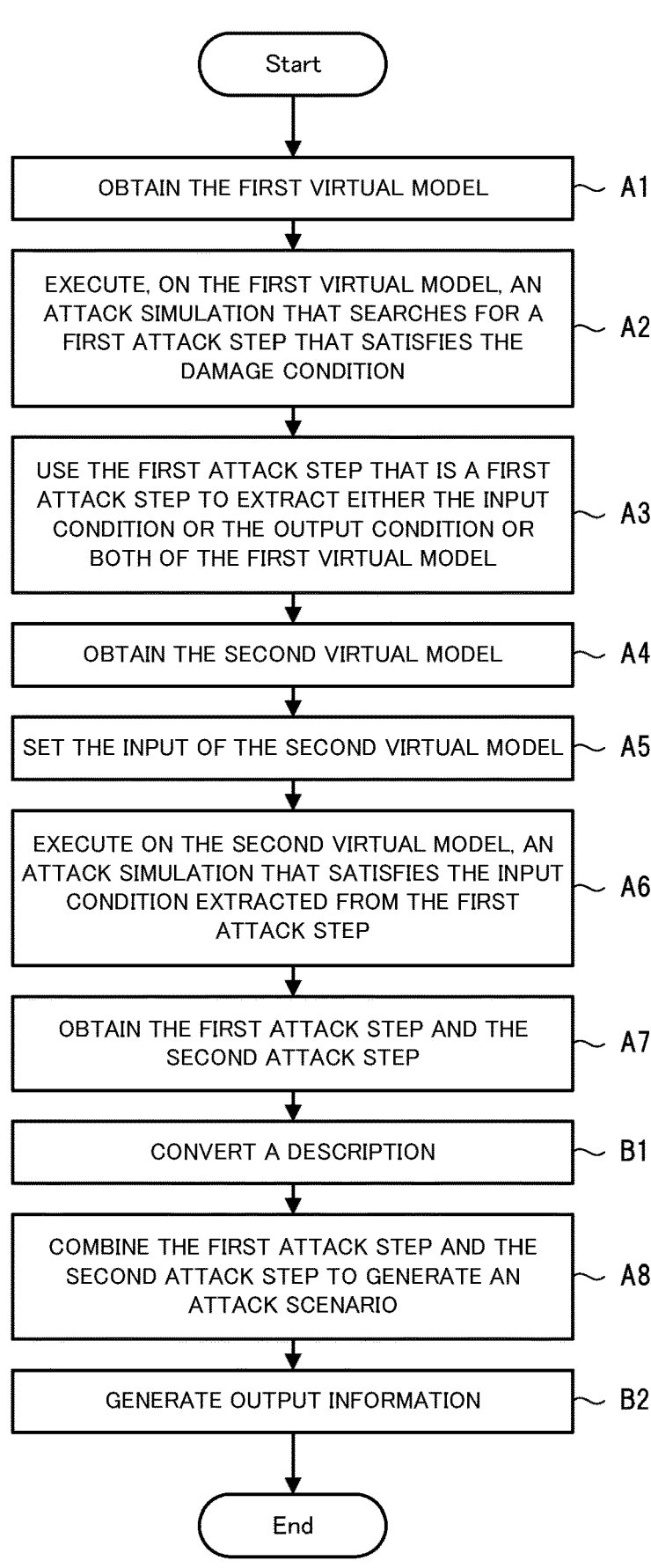
FIG. 13 is a diagram for describing an example of operation of the attack scenario generating apparatus.

Next, operation of the attack scenario generating apparatus in the second example embodiment will be described using FIG. 13. FIG. 13 is a diagram for describing an example of operation of the attack scenario generating apparatus. Figures will be referred to as needed in the following description. Also, in the second example embodiment, an attack scenario generating method is implemented by causing the attack scenario generating apparatus to operate. Thus, a description of the operation of the attack scenario generating apparatus substitutes for a description of the attack scenario generating method in the second example embodiment below The difference between the Embodiments 1 and 2 lies in steps B1 and B2. Steps A1 to A8 were described in the first example embodiment, and thus the description of the steps A1 to A8 is omitted.

In step B1, if there are different types of attack simulations, the conversion unit 15 converts the input condition and the output condition into a description that correspond to the target type of attack simulation.

In step B2, the output information generating unit 16 generates output information for displaying, on the output device 50, at least one or more of the entire virtual model of the target system, divided virtual models, attack steps, attack scenarios, damage conditions, input conditions, and output conditions.

Effects of Second Example Embodiment

With the second example embodiment, in addition to effects equivalent to those of the first example embodiment, the description of the input condition and the output condition can be converted, and thus different attack simulations can be combined to generate an attack scenario.

Third Example Embodiment

Figure 14:
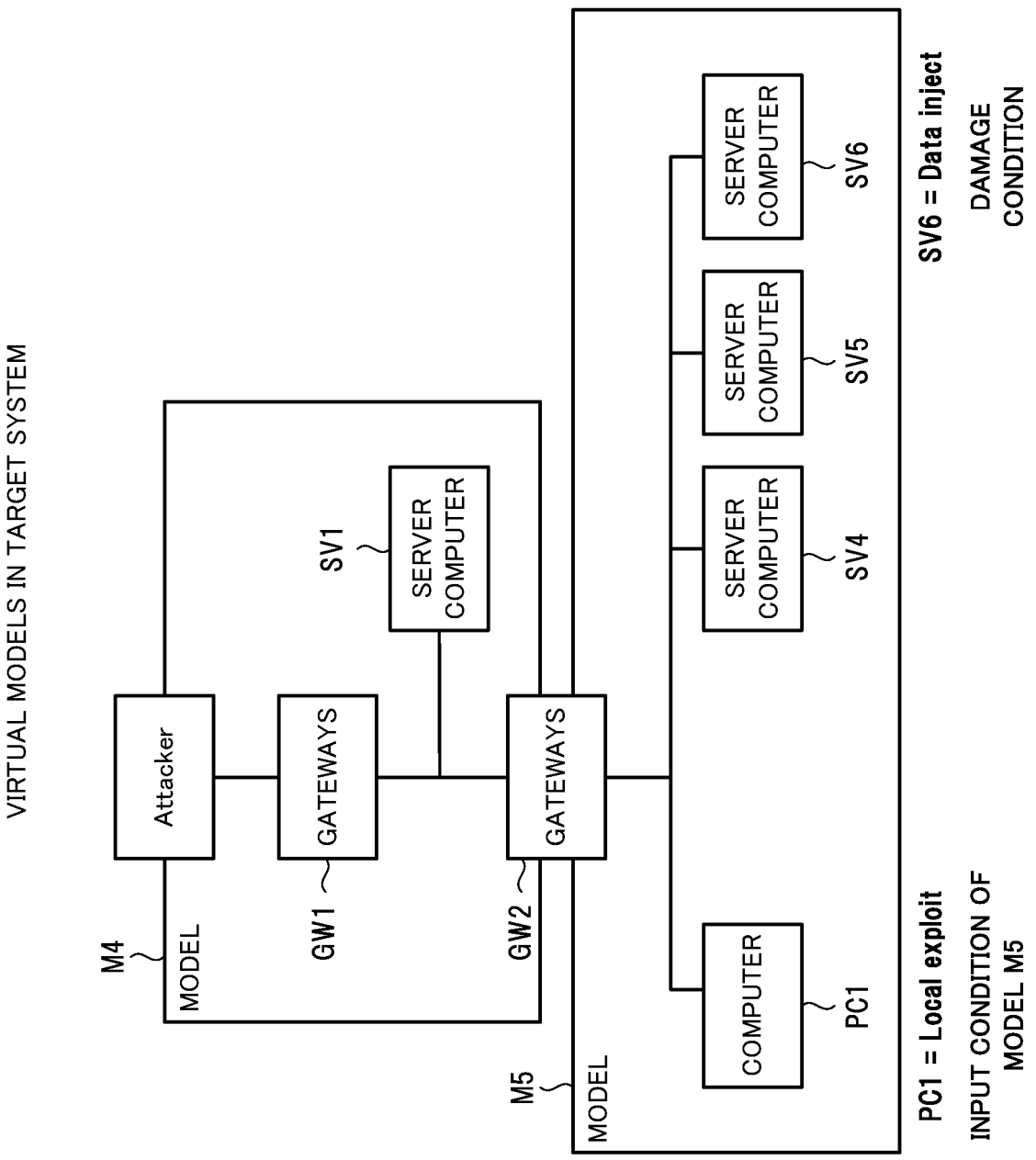
FIG. 14 is a diagram for describing a third example embodiment.

FIG. 14 is a diagram for describing a third example embodiment. The virtual models in FIG. 14 include models M4 and M5.

The model M4 includes an intrusion port Attacker, gateways GWT and GW2, and a server computer SV1, which represent functions of devices and the like. Also, the model M5 includes a gateway GW2, a computer PC1, and server computers SV4, SV5, and SV6.

In the third example embodiment, first, the first attack step detection unit 11 executes an attack simulation on the model M5, and detects an attack step S5 that satisfies the damage condition (SV6=Data-inject) with which damage occurs in the model M5.

Next, the input/output condition extraction/extracting unit 12 extracts the input condition (PC1=Local exploit) of the model M5 from the detected attack step S5.

Next, the second attack step detection unit 13 executes an attack simulation on the model M4 associated with the model M5 using the input condition (PC1=Local exploit) extracted from the attack step S5 as input, and detects the attack step S4 satisfying the input condition extracted from the attack step S5 using the output of the model M4.

FIG. 15 is a diagram for describing an attack scenario of the third example embodiment. In the description of the attack step S4 of the model M4, first, an attacker transmits improper data to the server computer SV1 from the intrusion port Attacker via the gateway GW1 (injection attack. Data-inject). Next, improper data is transferred to the computer PC from the server computer SV1 via the gateway GW2. Then, when the improper data is opened in the computer PC1, infection by malware occurs (Local exploit).

Also, in the description of the attack step S5 in the model M5, first, the computer PC1 attacks the server computer SV4. Next, the server computer SV4 registers improper data in the server computer SV6. Note that, in the attack steps S4 and S5, some of the states of the devices in the steps are omitted.

The combining unit 14 combines the attack step S4 and the attack step S5, and generates an attack scenario. Specifically, the output of the computer PC1 of the attack step S4 (PC1=Local exploit) and the input of the computer PC1 of the attack step S5 (PC1=Local exploit) are the same and thus are combined.

Effects of Third Example Embodiment

With the third example embodiment, it is possible to add to effects equivalent to those of the first example embodiment.

[Program]

The program according to the first to third example embodiments may be a program that causes a computer to execute steps A1 to A8 shown in FIG. 8, or steps A1 to A8 and B1 to B2 shown in FIG. 13. By installing this program in a computer and executing the program, the attack scenario generating apparatus and the attack scenario generating method according to the first to third example embodiments can be realized. Further, the processor of the computer performs processing to function as the first attack step detection unit 11, the input/output condition extraction unit 12, the second attack step detection unit 13, the combining unit 14, the conversion unit 15 and the output information generating unit 16.

Also, the program according to the first to third example embodiments may be executed by a computer system constructed by a plurality of computers. In this case, for example, each computer may function as any of the first attack step detection unit 11, the input/output condition extraction unit 12, the second attack step detection unit 13, the combining unit 14, the conversion unit 15 and the output information generating unit 16.

[Physical Configuration]

Figure 16:
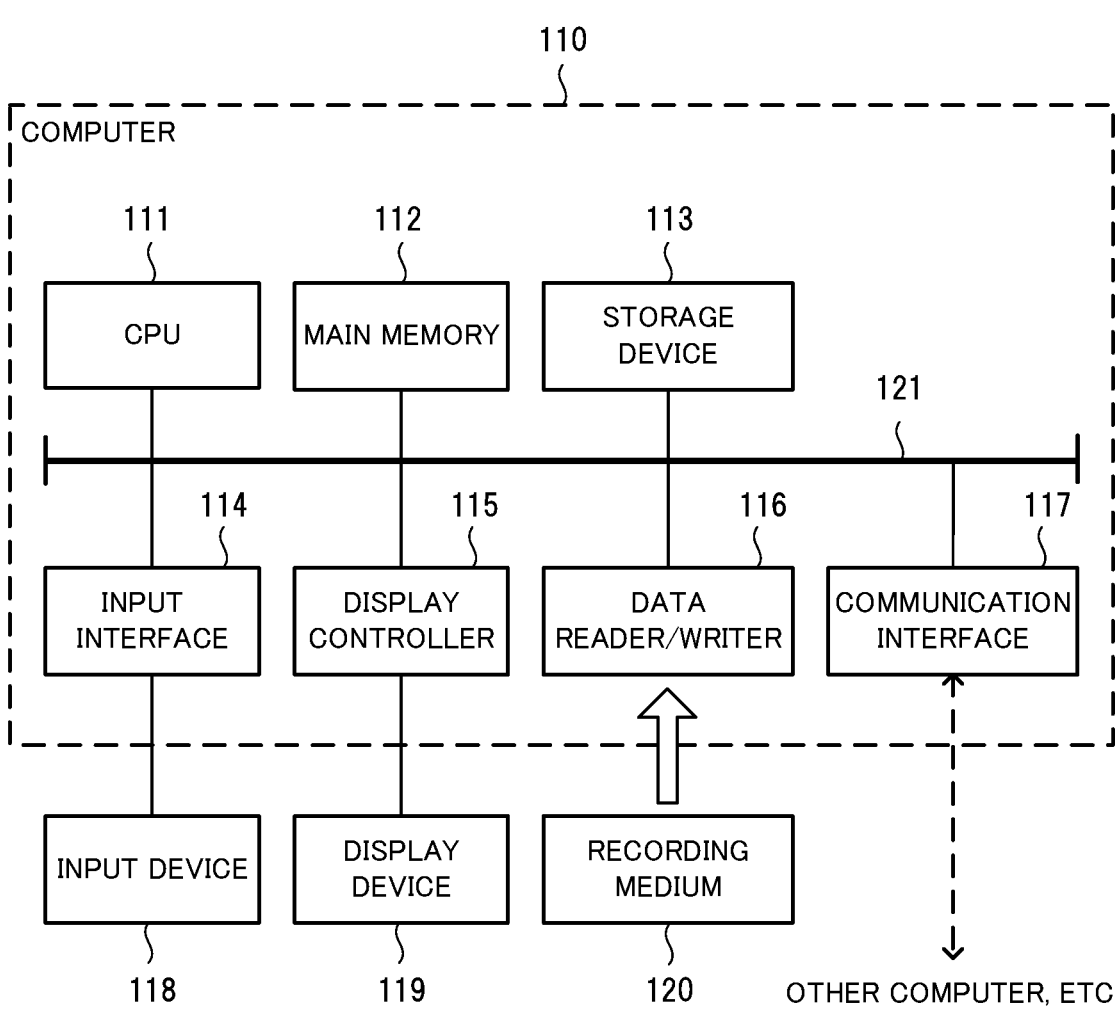
FIG. 16 is a block diagram showing an example of a computer that realizes the attack scenario generating apparatus in the first to third example embodiments.

Here, a computer that realizes an attack scenario generating apparatus by executing the program according to the first to third example embodiments will be described with reference to FIG. 16. FIG. 16 is a block diagram showing an example of a computer that realizes the attack scenario generating apparatus according to the first to third example embodiments.

As shown in FIG. 16, a computer 110 includes a CPU (Central Processing Unit) 111, a main memory 112, a storage device 113, an input interface 114, a display controller 115, a data reader/writer 116, and a communications interface 117. These units are each connected so as to be capable of performing data communications with each other through a bus 121. Note that the computer 110 may include a GPU (Graphics Processing Unit) or an FPGA (Field-Programmable Gate Array) in addition to the CPU 411 or in place of the CPU 411.

The CPU 111 opens the program (code) according to the example embodiments, which has been stored in the storage device 113, in the main memory 112 and performs various operations by executing the program in a predetermined order. The main memory 112 is typically a volatile storage device such as a DRAM (Dynamic Random Access Memory). Also, the program according to this example embodiment is provided in a state being stored in a computer-readable recording medium 120. Note that the program according to the example embodiments may be distributed on the Internet, which is connected through the communications interface 117.

Also, other than a hard disk drive, a semiconductor storage device such as a flash memory can be given as a specific example of the storage device 113. The input interface 114 mediates data transmission between the CPU 111 and an input device 118, which may be a keyboard or mouse. The display controller 115 is connected to a display device 119, and controls display on the display device 119.

The data reader/writer 116 mediates data transmission between the CPU 111 and the recording medium 120, and executes reading of a program from the recording medium 120 and writing of processing results in the computer 110 to the recording medium 120. The communications interface 117 mediates data transmission between the CPU 111 and other computers.

Also, general-purpose semiconductor storage devices such as CF (Compact Flash (registered trademark)) and SD (Secure Digital), a magnetic recording medium such as a Flexible Disk, or an optical recording medium such as a CD-ROM (Compact Disk Read-Only Memory) can be given as specific examples of the recording medium 120.

Also, instead of a computer in which a program is installed, the attack scenario generating apparatus 10 according to the first to third example embodiments can also be realized by using hardware corresponding to each unit. Furthermore, a portion of the attack scenario generating apparatus 10 may be realized by a program, and the remaining portion realized by hardware.

[Supplementary Notes]

Furthermore, the following supplementary notes are disclosed regarding the example embodiments described above. Some portion or all of the example embodiments described above can be realized according to (supplementary note 1) to (supplementary note 9) described below, but are not limit the below description.

(Supplementary Note 1)

An attack scenario generating apparatus comprising:

first attack step detection unit executes an attack simulation on a first virtual model obtained from a storage device in which a plurality of virtual models used to represent a target system are stored, and detects a first attack step that satisfies a damage condition with which damage occurs in the first virtual model;

an input/output condition extraction unit extracts an input condition or an output condition of the first virtual model from the detected first attack step, or both the input condition and the output condition;

a second attack step detection unit executes an attack simulation on a second virtual model obtained from the storage device, and detects a second attack step in which output of the second virtual model satisfies the input condition; and a combination unit combines the first attack step and the second attack step to generate an attack scenario.

(Supplementary Note 2)

The attack scenario generating apparatus according to Supplementary Note 1, further comprising conversion unit converts, in a case where the attack simulations are of different types, the input condition and the output condition into descriptions that correspond to the types of the attack simulations.

(Supplementary Note 3)

The attack scenario generating apparatus according to Supplementary Note 1 or 2, wherein a plurality of the first and second attack steps are generated in parallel.

(Supplementary Note 4)

An attack scenario generating method in which a computer is caused to carry out:

executing an attack simulation on a first virtual model obtained from a storage device in which a plurality of virtual models used to represent a target system are stored, and detecting a first attack step that satisfies a damage condition with which damage occurs in the first virtual model;

extracting an input condition or an output condition of the first virtual model from the detected first attack step, or both the input condition and the output condition;

executing an attack simulation on a second virtual model obtained from the storage device, and detecting a second attack step in which output of the second virtual model satisfies the input condition; and combining the first attack step and the second attack step to generate an attack scenario.

(Supplementary Note 5)

An attack scenario generating method according to Supplementary Note 4, wherein, in a case where the attack simulations are of different types, the computer converts the input condition and the output condition into descriptions that correspond to the types of the attack simulations.

(Supplementary Note 6)

The attack scenario generating method according to Supplementary Note 4 or 5, wherein a plurality of the first and second attack steps are generated in parallel.

(Supplementary Note 7)

A computer readable recording medium that includes a program recorded thereon, the program including instructions that cause a computer to carry out:

executing an attack simulation on a first virtual model obtained from a storage device in which a plurality of virtual models used to represent a target system are stored, and detecting a first attack step that satisfies a damage condition with which damage occurs in the first virtual model;

extracting an input condition or an output condition of the first virtual model from the detected first attack step, or both the input condition and the output condition;

executing an attack simulation on a second model obtained from the storage device, and detecting a second attack step in which output of the second virtual model satisfies the input condition; and combining the first attack step and the second attack step to generate an attack scenario.

(Supplementary Note 8)

The computer readable recording medium according to Supplementary Note 7, wherein, in a case where the attack simulations are of different types, the program causes the computer to convert the input condition and the output condition into descriptions that correspond to the types of the attack simulations.

(Supplementary Note 9)

The computer readable recording medium according to Supplementary Note 7 or 8, wherein the program causes the computer to generate a plurality of the first and second attack steps in parallel.

Although the present invention of this application has been described with reference to exemplary embodiments, the present invention of this application is not limited to the above exemplary embodiments. Within the scope of the present invention of this application, various changes that can be understood by those skilled in the art can be made to the configuration and details of the present invention of this application.

INDUSTRIAL APPLICABILITY

As described above, according to the present invention, it is possible to reduce the processing time required to generate an attack scenario. The present invention is useful in fields where it is necessary to generate an attack scenario.

REFERENCE SIGNS LIST

10 Attack scenario generating apparatus
11 First attack step detection unit
12 Input/output condition extraction unit
13 Second attack step detection unit
14 Combining unit
15 Conversion unit
16 Output information generating unit
20 Input device
30 Storage device
40 Attack simulation apparatus
50 Output device
100 System
110 Computer
111 CPU
112 Main memory
113 Storage device
114 Input interface
115 Display controller
116 Data reader/writer
117 Communications interface
118 Input device
119 Display device
120 Recording medium
121 Bus

What is claimed is:

1. An attack scenario generating apparatus comprising:
at least one memory storing instructions; and
at least one processor configured to execute the instructions to:

execute an attack simulation on a first virtual model obtained from a storage device in which a plurality of virtual models used to represent a target system are stored, and detect a first attack step that satisfies a damage condition with which damage occurs in the first virtual model;

extract an input condition or an output condition of the first virtual model from the detected first attack step, or both the input condition and the output condition;

execute an attack simulation on a second virtual model obtained from the storage device, and detect a second attack step in which output of the second virtual model satisfies the input condition; and combine the first attack step and the second attack step to generate an attack scenario.

2. The attack scenario generating apparatus according to claim 1, further comprising
the at least one processor is configured to execute the instructions to:
convert, in a case where the attack simulations are of different types, the input condition and the output condition into descriptions that correspond to the types of the attack simulations.

3. The attack scenario generating apparatus according to claim 1,
wherein a plurality of the first and second attack steps are generated in parallel.

4. An attack scenario generating method in which a computer is caused to carry out:
executing an attack simulation on a first virtual model obtained from a storage device in which a plurality of virtual models used to represent a target system are stored, and detecting a first attack step that satisfies a damage condition with which damage occurs in the first virtual model;

extracting an input condition or an output condition of the first virtual model from the detected first attack step, or both the input condition and the output condition;

executing an attack simulation on a second virtual model obtained from the storage device, and detecting a second attack step in which output of the second virtual model satisfies the input condition; and combining the first attack step and the second attack step to generate an attack scenario.

5. An attack scenario generating method according to claim 4,
wherein, in a case where the attack simulations are of different types, the computer converts the input condition and the output condition into descriptions that correspond to the types of the attack simulations.

6. The attack scenario generating method according to claim 4,
wherein a plurality of the first and second attack steps are generated in parallel.

7. A non-transitory computer readable recording medium that includes a program recorded thereon, the program including instructions that cause a computer to carry out:
executing an attack simulation on a first virtual model obtained from a storage device in which a plurality of virtual models used to represent a target system are stored, and detecting a first attack step that satisfies a damage condition with which damage occurs in the first virtual model;

extracting an input condition or an output condition of the first virtual model from the detected first attack step, or both the input condition and the output condition;

executing an attack simulation on a second virtual model obtained from the storage device, and detecting a second attack step in which output of the second virtual model satisfies the input condition; and combining the first attack step and the second attack step to generate an attack scenario.

8. The non-transitory computer readable recording medium according to claim 7, wherein, in a case where the attack simulations are of different types, the program causes the computer to convert the input condition and the output condition into descriptions that correspond to the types of the attack simulations.

9. The non-transitory computer readable recording medium according to claim 7, wherein the program causes the computer to generate a plurality of the first and second attack steps in parallel.

\* \* \* \* \*